US012568058B2

(12) United States Patent
Pal

(10) Patent No.: US 12,568,058 B2
(45) Date of Patent: Mar. 3, 2026

(54) APPLICATION MANAGER FOR PLATFORM INTEROPERABILITY

(71) Applicant: DISH Network L.L.C., Englewood, CO (US)

(72) Inventor: Rajiv Singh Cullen Pal, Casper, WY (US)

(73) Assignee: DISH NETWORK L.L.C., Englewood, CO (US)

( * ) Notice: Subject to any disclaimer, the term of this patent is extended or adjusted under 35 U.S.C. 154(b) by 62 days.

(21) Appl. No.: 18/544,078

(22) Filed: Dec. 18, 2023

(65) Prior Publication Data

US 2025/0202849 A1     Jun. 19, 2025

(51) Int. Cl.
G06F 15/16      (2006.01)
G06Q 50/00      (2012.01)
H04L 51/046     (2022.01)
H04L 51/066     (2022.01)

(52) U.S. Cl.
CPC ........... H04L 51/046 (2013.01); G06Q 50/01 (2013.01); H04L 51/066 (2013.01)

(58) Field of Classification Search
USPC .................................................. 709/204, 206
See application file for complete search history.

(56) References Cited

U.S. PATENT DOCUMENTS

| | | | |
|---|---|---|---|
| 2012/0136943 A1* | 5/2012 | Paul ........................ | H04L 51/10 709/206 |
| 2016/0112366 A1* | 4/2016 | Olsen ...................... | H04L 51/52 709/206 |
| 2016/0269343 A1* | 9/2016 | Li ........................... | H04L 51/52 |
| 2018/0183738 A1* | 6/2018 | Parnell ................... | G06Q 50/01 |

* cited by examiner

*Primary Examiner* — Wing F Chan
*Assistant Examiner* — Andrew Woo
(74) *Attorney, Agent, or Firm* — Seed Intellectual Property Law Group LLP

(57) ABSTRACT

Systems, methods, and articles are described herein for receiving a message from a first platform and sending the message to a recipient using a second platform. A message is received for a first platform. A recipient of the message is determined. Then, a second platform used by the recipient is determined. The message is modified from a first format of the first platform to a second format of the second platform. The modified message is then provided in the second format to the second platform to be made available to the recipient.

20 Claims, 7 Drawing Sheets

*500*

START

502 — Receive message for user from sender formatted for first platform used by sender 504 — Determine second platform used by user 506 — Modify message to be used with second platform 508 — Provide modified message to user via second application for second platform

END

600

User Device 104

Memory 604

Application Manager 106

Message converter module 608

Administrator module 610

Quantifier module 612

Social Media Applications 620

Other data 622

Processor 644

I/O Interfaces 648

Other Computer-Readable Media 650

Network Connections 652

APPLICATION MANAGER FOR PLATFORM INTEROPERABILITY

BACKGROUND

Many different social media platforms exist, providing a range of user experiences. Each social media platform has a distinctive user interface and may offer different text-based content, video-based content, etc. Because there are so many social media platforms to choose from, each user may pick one social media platform out of the many that best suits their needs. But the large number of social media platforms also means it is impractical for a user to be active on every social media platform, or even a significant portion of the available platforms. This leads to situations where users may wish to communicate with each other, but don't have or use the same social media application. It is with respect to these and other considerations that the embodiments herein have been made.

BRIEF SUMMARY

Embodiments of the present disclosure are directed towards methods, systems, and articles for facilitating messaging across platforms, such as different social media platforms. An application manager receives a message for a first platform and determines the recipient of the message. The application manager then determines a second platform used by the recipient. The message is modified from a format of the first platform to a second format of the second platform. The modified message is then provided in the second format to the second platform to be made available to the recipient.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
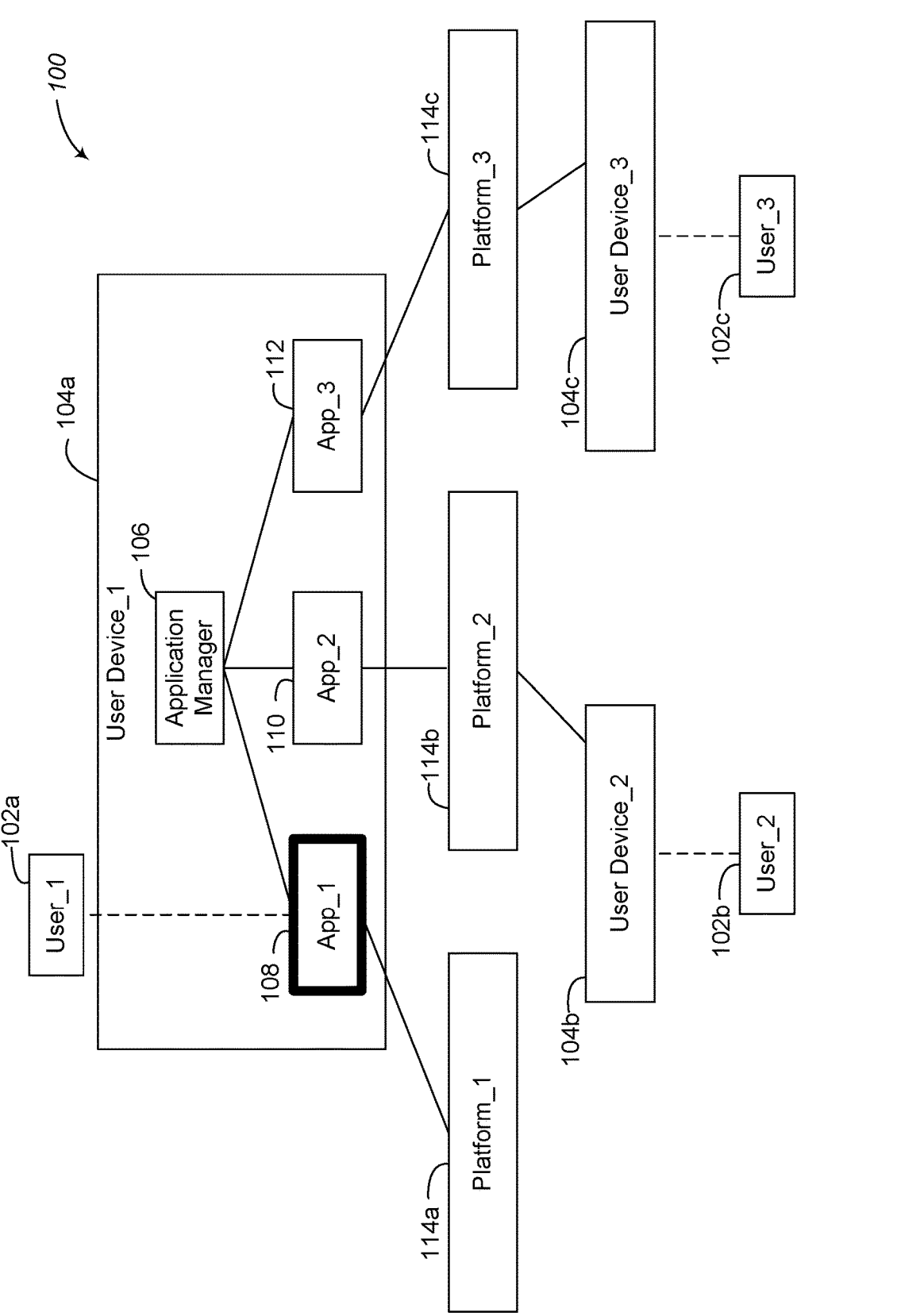
FIG. 1 illustrates a context diagram of one embodiment of a system for facilitating messaging between social media applications in accordance with embodiments described herein.

FIG. 1 illustrates a context diagram of one embodiment of a system 100 for facilitating messaging between social media applications in accordance with embodiment described herein. In this example, system 100 includes user devices 104a-104c and platforms 114a-114c.

Platforms 114a-114c are configured to enable users 102a-102c of user devices 104a-104c to communicate or share information with each other or other users (not illustrated). Platforms 114a-114c may be individually or collectively referred to as platform 114 or platforms 114 and may be any server, computing device, cloud computing environment, or some other computing system configured to process communications transmitted from or to be received by user devices 104a-104c. Platform_1 114a may be a first social media platform, Platform_2 114b may be a second social media platform, and platform_3 114c may be a third social media platform, which may each be different social media platforms. Examples of social media platforms may include, but are not limited to, Meta® (formerly Facebook®), X® (formerly Twitter), Snapchat®, Instagram®, LinkedIn®, etc. In some embodiments, platforms 114 may include voice or video calling platforms such as Skype®, private branch exchange, public switched telephone network, etc. In other embodiments, platforms 114 may include text-based messaging platforms such as SMS, Whatsapp®, Messenger®, MMS, etc. In yet other embodiments, platforms 114 may include any communications platform accessible by user devices 104a-104c.

User devices 104a-104c are configured to communicate with each other via platforms 114a-114c, or other computing devices (not illustrated). User devices 104a-104c may be individually or collectively referred to as user device 104 or user devices 104 and may be any type of mobile or stationary computing device, such as a mobile phone, a desktop computer, a laptop computer, a virtual machine, a tablet computer, a server, etc. In this illustrative example, user device 104a has installed thereon application_1 108, application_2 110, and application_3 112. An application is configured to correspond to a platform 114a-114c, allowing a user to access the platform through the application. For example, platform_1 114a may be a first social media platform corresponding to application_1 108, while platform_2 114b may be a second social media platform corresponding to application_2 110, and platform_3 114c may be a social media platform corresponding to application_3 112. In this way, the applications 108, 110, and 112 may be the particular Meta® (formerly Facebook®), X® (formerly Twitter), Snapchat®, Instagram®, LinkedIn®, Skype®, Whatsapp®, Messenger®, SMS messaging application, voice or video application, etc. In some embodiments, an application may be a web browser that is configured to access a platform 114 via the internet.

User device_1 104a also has installed thereon an application manager 106. In some embodiments, application manager 106 allows interoperability between an application used by a first user and an application used by a second user, as described herein.

The following is a use case example of users 102a-102c interacting with user devices 104a-104c that employ embodiments described herein to communicate or share information with one another using different platforms and applications. In this use case example, assume users 102a-102c often have an application they prefer to use. Even if a user downloads a social media application used by another user, the user may not use the downloaded application. The user may dislike an interface, content format, community, or any other aspect of the downloaded application. Thus, the user may interact with the downloaded application infrequently, leading to missed messages and inconsistent communication between the user and the other user. This problem is compounded by the potentially large number of other users the user may wish to communicate with. The user may have downloaded many applications various other users use but be unwilling or unable to use the many downloaded applications consistently enough to maintain contact with the various other users.

For example, user_1 102a interacts with user device_1 104a, and application 108 in particular, as indicated by the bolded perimeter. And user_2 102b interacts with user device_2 104b, while user_3 102c interacts with user device_3 104c. If user 102a wishes to send a message to users 102b and 102c via application_1 108, the application manager 106 converts the message from a format or form of social media platform_1 114a (and application_1 108) to a format or form of social media platform_2 114b to be sent to or accessed by user 102b and to a format of social media platform_3 114c to be sent to or accessed by user 102c, which is described in more detail herein.

Although FIG. 1 illustrates the user devices and platforms as communicating directly with one another, embodiments are not so limited. Rather, user devices or platforms may interact or communicate with one another via other computing systems, environments, or components via one or more wired or wireless networks.

Embodiments of the present disclosure improve the functioning of computers by reducing the number of messages sent to inactive social media accounts. For example, a user may use a first social media platform, while an intended recipient of a message may use a second social media platform. By converting messages from a format of the first social media platform to a format of the second social media platform, and vice versa, the user and the intended recipient may each use their used social media platform while communicating with each other. This reduces the number of messages sent to unused social media platform accounts, allowing for fewer messages to be sent over the network. Accordingly, the computer and network resources required to send messages to unused social media platform accounts is reduced.

Use of social media applications used herein may refer to any computing application that enables a user to communicate with another user or access communications provided by another user. Accordingly, the application manager may enable communication via similar social media formats, such as from one text-based messaging platform (e.g., SMS text message) to another text-based messaging platform (e.g., email) or from one voice-based messaging platform (e.g., a Skype call) to another voice-based messaging platform (e.g., regular voice communication via mobile phone), or via different social media formats, such as from a one messaging platform format (e.g., Facebook) to a different messaging platform format (e.g., X), or some combination thereof.

Figure 2A:
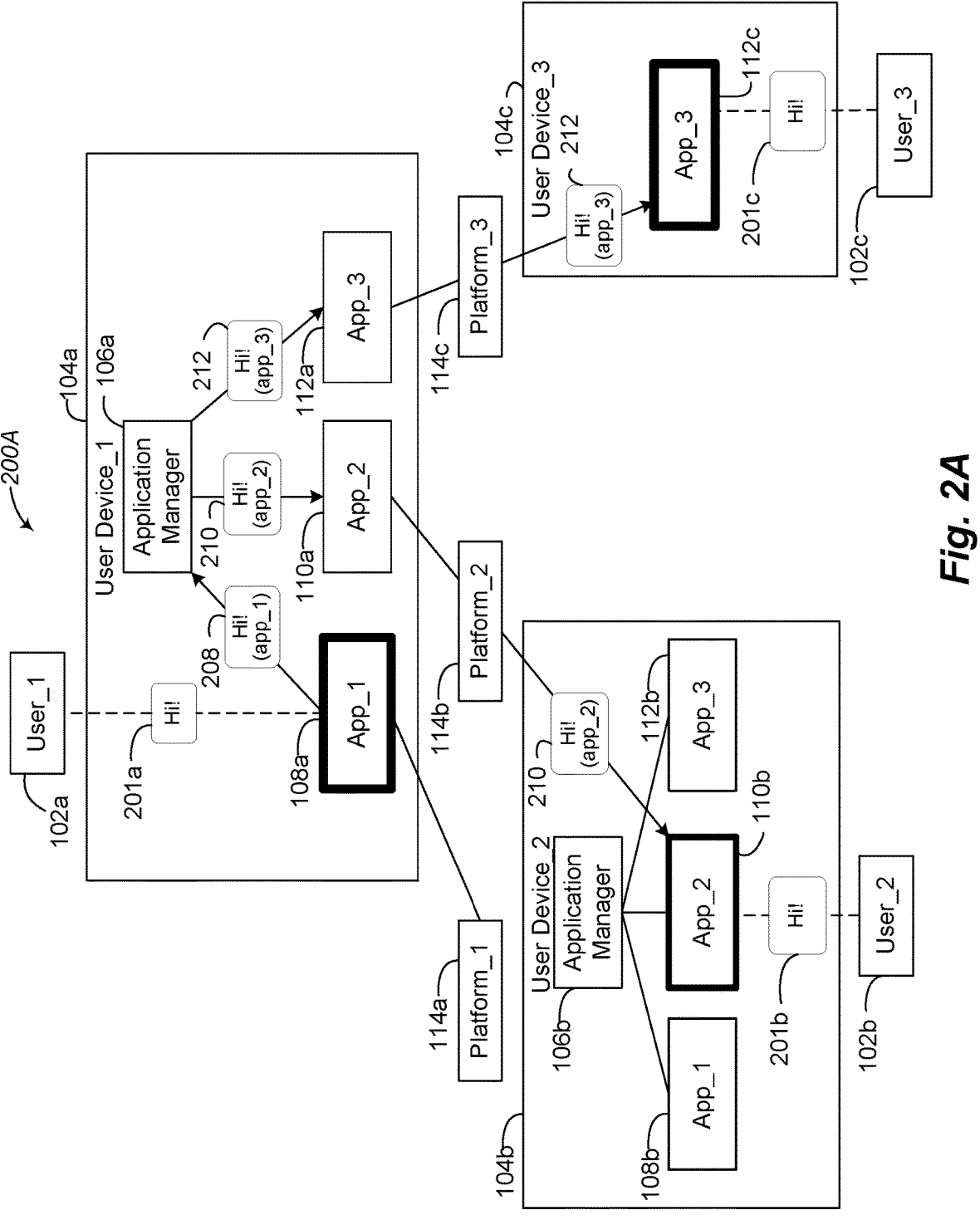
FIGS. 2A-2B illustrate context diagrams of embodiments of a system for sending a message for one social media platform to recipients using other social media platforms in accordance with embodiments described herein.

FIG. 2A illustrates a context diagram of one embodiment of a system 200A for sending a message for one social media platform to recipients using other social media platforms in accordance with embodiments described herein. In this example, system 200A includes user device 104a, user device 104b, user device 104c, as well as platforms 114a-114c, similar to what is illustrated in FIG. 1.

In this illustrative example, user device_1 104a has installed thereon application_1 108a, application_2 110a, application_3 112a, and application manager 106a, similar to what is shown in FIG. 1. User device_2 104b has installed thereon application_1 108b, application_2 110b, application_3 112b and application manager 106b. And user device_3 104c has installed therein application_3 112c. User_1 102a interacts with user device_1 104a via application_108aUser_2 102b interacts with user device_2 104b via application_2 110b. And user_3 interacts with user device_3 104c via application_3 112b.

User_1 inputs content 201a to application_1 108a. Application_1 108a generates message 208 from the content 201a. Message 208 is formatted for platform_1 114a. Application manager 106a receives the message 208 from application_1 108a. As described herein, the application manager 106a identifies or determines one or more recipients for the message 208 (or for the content 201a of the message 208). In this example, the application manger 106a determines that user_2 102b and user_3 102c are recipients of the message. The application manager 106a then determines the social media platforms used by user_2 102b and user_3 102c. In this case, the application manager 106a determines that user_2 102b uses social media platform_2 114b via application_2 110b and user_3 102c uses social media platform_3 114c via application_3 104c.

Application manager 106a then converts the message 208 into a message 210 that is formatted for social media platform_2 114b for user_2 102b and a message 212 that is formatted for social media platform_3 212a for user_3 102c. Application manager 106a then uses application_2 110a to forward the message 210 to social media platform_2 114b and also uses application_3 112a to forward the message 212 to social media platform_3 114c. In this way, platform_2 114b make the message 210 and content 201b available to user_2 102b via application 110b on user device_2 104b, and platform_3 114c makes the message 212 and content 201c available to user_3 102c via application_3 112c on user device_3 1104c.

Figure 2B:
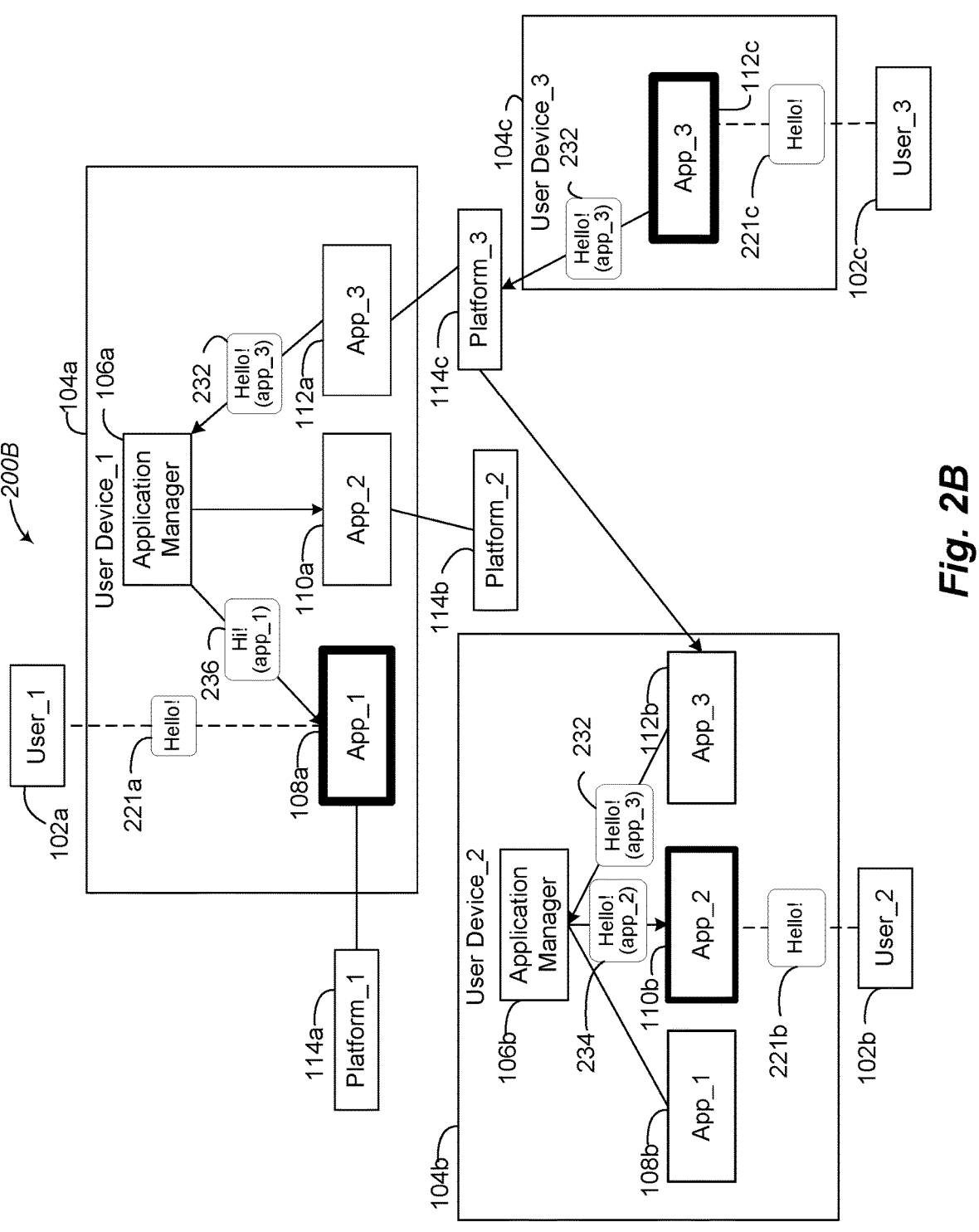

FIG. 2B illustrates a context diagram of one embodiment of a system 200B for sending a message for one social media platform to recipients using other social media platforms in accordance with embodiments described herein. In this example, system 200B is an embodiment of system 200A in FIG. 2A, but where user_3 102c of user device 104c is replying to the message and content sent in FIG. 2A.

User_3 inputs content 221c to application_3 112c of user device 104c. Application_3 112c generates message 232 from the content 221c. Message 232 is formatted for platform_3 114c. Application_3 112c sends the message 232 to platform_3 114c, which makes message 232 and content 221c available to application_3 112b on user device_2 104b and to application_3 112a on user device_1 104a.

In this situation, neither user_1 102a nor user_2 102b use application_3. Accordingly, application manager 106b on user device_2 104b receives message 232 from application_3 112b. In some embodiments, application manager 106b may intercept message 232 before it is received by application_3 112b. Application manager 106b then determines the social media platform used or preferred by user_2 102b. In this case, the application manager 106b determines that user_2 102b uses social media platform_2 114b via application_2 110b. Application manager 106b then converts the message 232 into a message 234 that is formatted for social media platform_2 114b for user_2 102b. Application manager 106b then uses application_2 110b to present content 221b from message 234 to user_2 102b.

Similarly, application manager 106a on user device_1 104a receives message 232 from application_3 112a. In some embodiments, application manager 106a may intercept message 232 before it is received by application_3 112a. Application manager 106a then determines the social media platform used or preferred by user_1 102a. In this case, the application manager 106a determines that user_1 102a uses social media platform_1 114a via application_1 108a. Application manager 106a then converts the message 232 into a message 236 that is formatted for social media platform_1 114a for user_1 102a. Application manager 106a then uses application_1 110a to present content 221a from message 236 to user_1 102a.

As discussed in detail herein, a message sent from a device implementing an application manager may be converted into formats of any number of social media platforms and sent to any number of users of those social media platforms. Similarly, a device implementing a device manager may receive a message formatted for any social media platform and convert the received message into a format for a used social media platform of a user and present the received message using an application of the used social media platform. Moreover, although embodiments described herein refer to the application manager as being installed on a user device, embodiments are not so limited. In some embodiments, the application manager may be installed on a third-party server that acts as an intermediary between user devices. Furthermore, in some embodiments, the applications may not be installed on the user devices, rather the application manager may access the platforms 114a-114c via one or more websites or web-based interfaces.

Additionally, while embodiments discussed with respect to FIGS. 2A-2B primarily involve delivery of a message using an application for a social media platform, such as application_2 110b, embodiments are not so limited. In some embodiments, the application manager 106 itself may be used as a generic social media application to communication with one or a plurality of social media platforms. For example, assume a user dislikes using certain social media applications and is dissatisfied with the experience those applications provide, but that user would still like to communicate with other users that use those social media applications.

In some embodiments, application manager 136 provides a custom user interface by which the user interacts. The custom user interface may enable the user to communicate with other social media applications not associated with the application manager. The custom user interface may be configurable by the user so that content is delivered to the user in a specified format, has specified graphical user interface features, includes specific notification policies, enables integration with other applications, etc. In some embodiments, the user may specify features associated with various applications to include in the custom user interface. The user may also specify features to meet a specific requirement or need. For example, the user may have difficulty navigating application interfaces and may desire a simplified experience. The user may configure the custom user interface to provide messages received by the user's device in large-font text. In some embodiments, the user may configure the custom interface to translate messages received by the user's device in a selected language such as English, Spanish, Portuguese, etc.

In some embodiments, the user may download a preconfigured interface template that specifies a custom interface to be used by application manager 136. Preconfigured interface templates may be created by other users or provided through an online marketplace. In some embodiments, a preconfigured interface template may be shared as a message such that a recipient of the message may use the preconfigured interface template to configure their own custom user interface.

The operation of certain aspects will now be described with respect to FIGS. 3, 4, and 5. Processes 300, 400, and 500 described in conjunction with FIGS. 3, 4, and 5, respectively, may be implemented individually or collectively by one or more processors or executed individually or collectively via circuitry on one or more computing devices, such as user device_1 102 in FIG. 1.

Figure 3:
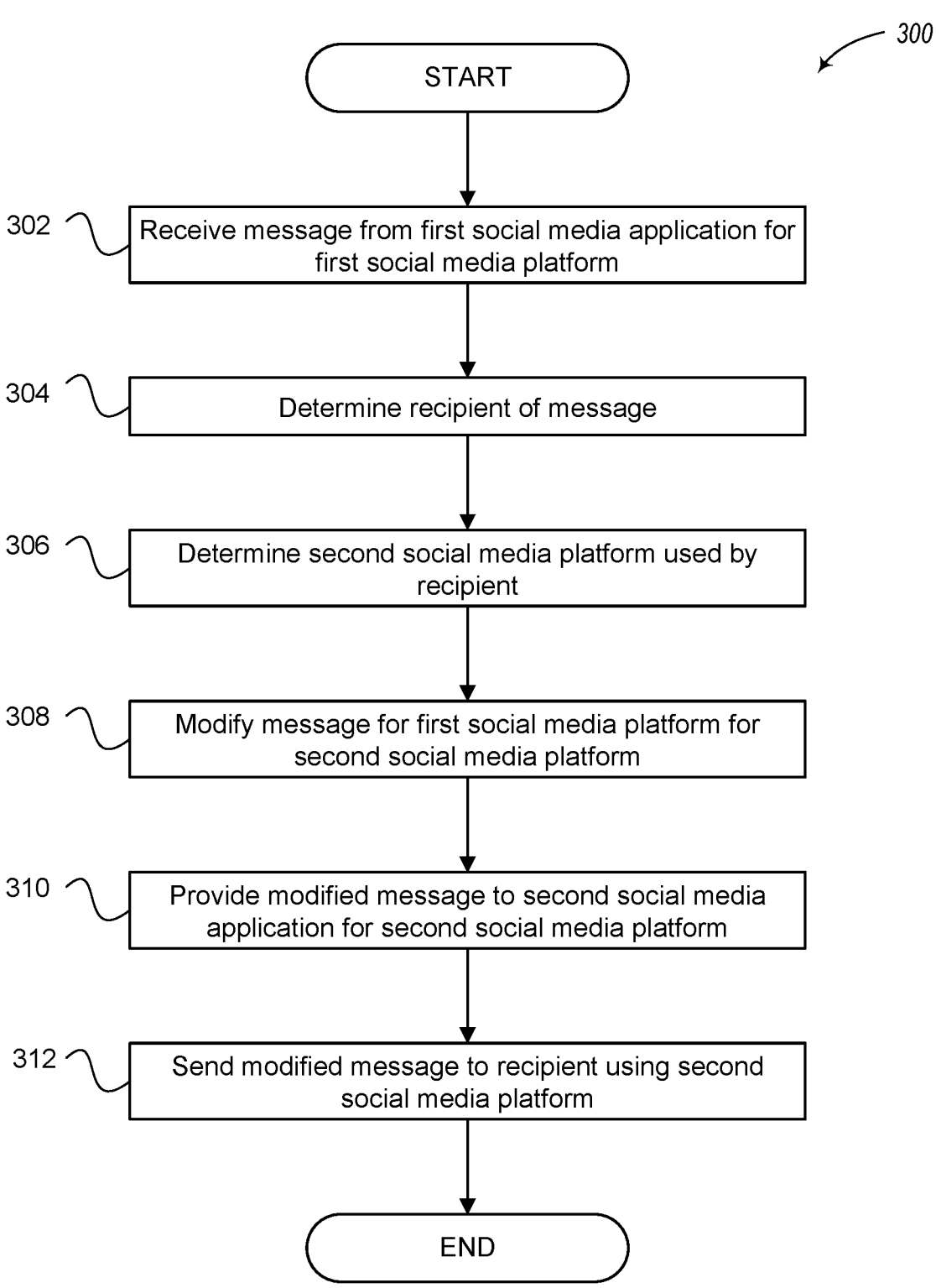
FIG. 3 illustrates a logical flow diagram showing one embodiment of a process for sending a message for a first social media platform to a recipient using a second social media platform in accordance with embodiments described herein.

FIG. 3 illustrates a logical flow diagram showing one embodiment of a process 300 for sending a message for a first social media platform to a recipient using a second social media platform in accordance with embodiments described herein. Process 300 may be performed by or executed on a computing device, such as user device 104 in FIG. 1. In some embodiments, process 300 may be performed by or executed on, in whole or in part, or another computing device (not illustrated in FIG. 1).

Process 300 begins, after a start block, at block 302, where an application manager receives a message from a first social media application for a first social media platform. The message is in some instances generated by the first social media application based on user input. For example, the first social media application may provide an interface for the user to input content including text, pictures, video, etc. Under some operations, the first social media application may generate the message based on the user input and provide the message to another user via the first social media platform, such as where the first social media platform posts the message for other users to view or the first social media platform forwards the message to an intended recipient. In some embodiments, the first social media application may directly provide the message to the application manager using an application programming interface (API). In other embodiments, the application manager monitors the first social media application on the user device and intercepts the message before it is sent off the user device to the first social media platform. According to some embodiments, the intercepted message is allowed to continue from the user device to the first social media platform. In other embodiments, the intercepted message is not allowed to continue from the user device to the first social media platform.

Process 300 continues after block 302 to block 304, where a recipient, or destination, of the message is determined. While the message may be directed to an account of the recipient on the first social media platform, the intended recipient is often a user potentially having multiple accounts across a variety of platforms.

The recipient may be specified by the user selecting an account of the recipient on the first social media platform or a different social media platform to send the message to. In some embodiments, the recipient may be determined by the contents of a message without the user specifying a recipient. For example, messages including pictures of the user's pet may have been sent to the recipient in the past. By comparing the contents of the message to the contents of previously sent messages, one or more likely recipients can be determined. The user may then select a recipient from the likely recipients or configure the application manager to automatically send the message to likely recipients. Previous messages between the user and the recipient may also be used to determine the recipient of the message.

Continuing to block 306, a second social media platform used by the recipient is determined. In some embodiments, a default platform may be selected for the recipient as the second social media platform. In other embodiments, the user specifies the second social media platform by an interface, voice control, or any other method of input. In some embodiments, the user device may store a table or other data structure indicating the second social media platform that is used for the recipient. For example, if the recipient has previously communicated with the user using a specific platform, the user device may store an indication that that specific platform is to be used as the second social media platform for communicating with the recipient. In some embodiments, the user device may scan emails, social media posts, profiles, or any other content associated with the recipient to determine the second social media platform used by the recipient. For example, in other embodiments, an email signature of an email sent by the recipient may list the second social media platform for that recipient. In other cases, the user device may determine the second social media platform for the recipient by checking one or more social media platforms for interactions between the user of the user device and the recipient.

In various embodiments, the user device or the application manager may maintain profiles for multiple possible recipients. Each profile may map different possible recipients to one or more different social media platforms. For example, a profile may include a username of the recipient for each social media platform the recipient has an account with, such that the recipient is associated with each of their various social media platform usernames. This allows a profile of the recipient to be established outside of the account on the first social media platform. The profile of the recipient may include a plurality of associated social media accounts, other contact methods, etc.

In some embodiments, the second social media platform may be determined based on compatibility between the first social media platform and the platforms used by the recipient. For example, if the user uses two different social media platforms, the second social media platform may be selected based on one of the social media platforms being more compatible with the message for the first social media platform. The first social media platform may be more compatible with the second social media platform if the message's content does not have to be converted to an unsuitable format for the second social media platform. For example, the user may wish to deliver a message with text content to the recipient, even if the recipient's used social media platform does not support text. An alternative social media platform may then be determined for sending the message with text content to the recipient. The user may configure the application manager to use social media applications that do not require content to be converted, to specify acceptable or unacceptable conversions, etc. For example, the user may specify that the application manager may not convert video content into text content, text content into video content, etc. Further embodiments of block 306 are described in more detail with respect to block 404 of FIG. 4.

Process 300 then continues from block 306 to block 308, where the message is modified from the first social media platform for use with the second social media platform. In some instances, a first format of the first social media platform may be incompatible with a second format of the second social media platform. For example, the first social media platform may require content to be video, while the second social media platform may require content to be text. The content of the message must therefore be converted from the first format to the second format. When the content is substantially altered, the device may seek confirmation from the user that they wish to convert text to video. In some instances, the device displays a preview of the content as it would be converted from the first format to the second format.

According to some embodiments, the content of the message may be converted for use on the second social media platform using generative artificial intelligence. For example, in converting text content to video content, text may be provided as a prompt to a generative artificial intelligence application, which outputs a video representation of the text content for use with the second social media platform. According to some embodiments, the application manager allows the user to select default settings to use in modifying the content of the message for the second social media platform. These settings may be set individually for a recipient, by individual social media platform, by content type, or for any combination thereof. For example, the user may specify that in modifying a message with text content into a message with video content, the video should display the text as a video in a certain font, on a certain background, for certain duration, etc. The application manager may also provide the user a preview of the content as modified for the second social media platform to accept, reject, or further modify. Similarly, audiovisual content may be converted to text content.

Furthermore, the second social media platform may require the message to comply with certain formatting or additional information requirements. In instances where the message is sent to the second social media platform using an application programming interface (API), the content may adhere to certain requirements of the API. For example, an API may require metadata related to the message being sent. This metadata may include a description of the content, a username of the user, a full name of the user, a source for the content, a timestamp for the content, a title for the content, etc. Therefore, the user device or the application manager may maintain templates for use with various social media platforms. The application manager may fill out the template for use with the second social media platform based on a template filled out for use with the first social media platform. In some instances, the application manger may implement algorithms for filling a template for use with the second social media platform based on the content provided by a user. According to some embodiments, the template for use with the second social media platform can include information received from various systems on the user device. For example, a social media platform may require information identifying a location, time, device, or other information from the user's device to use content on the social media platform. This information can be automatically retrieved from various interfaces of the user device.

Where metadata or formatting is to be altered to comply with a second format, the application manager may automatically modify the message to comply with formatting requirements of the second social media platform without seeking additional input from the user.

Process 300 continues from block 308 to block 310, where the modified message is provided to a second social media application for the second social media platform, which is installed on the user device. In some instances, the application manager interacts with the second social media application for the second social media platform by automatically filling in fields in an interface of the second social media application. This may be done when the second social media application is running in the background, such that the fields are not displayed to the user on the user device. In some embodiments, the modified message is provided to the second social media application using an API of the second social media application. Using an API of the second social media application may allow the application manager to interact with social media platforms that are not downloaded on the user device.

In some embodiments, the application manager opens the second social media application and displays it using a display of the user device. In these instances, the application manager may have prefilled fields in the second social media application necessary to send the message and display the prefilled fields to the user using the second social media application. Then, the user may manually modify one or more of the prefilled fields.

In block 312, after block 310, the modified message is sent to the recipient via the second social media platform. In various embodiments, the user device sends the modified message to the second social media platform using the second social media application. The second social media platform may then make the modified message available to the recipient using wireless communications, wired communications, or any combination thereof. After block 312, process 300 ends or otherwise returns to a calling process to perform other actions.

Although process 300 is described as modifying a message being sent to a single recipient, embodiments are not so limited. In some embodiments, the recipient is a plurality of recipients. The plurality of recipients may include multiple contacts of the user, a general account that is associated with multiple recipients, or the public. In various embodiments, the plurality of recipients may be determined at block 304 and a separate second social media platform is determined at block 306 for each separate recipient. In this way, the message is modified for each separate second social media platform at block 308 and provided to the corresponding second social media application at block 310. In some embodiments, process 300 may be performed multiple time sequentially or in parallel for each separate recipient of the message.

In some situations where the public is the recipient, the message may be made available to the public, and further recipients may be defined for the message. For example, the user may wish to make a message about a job, a relationship, or an event publicly viewable but further notify one or more contacts about the message, for example, by direct message. The one or more contacts may be specified by the user, inferred by the application manager, or a combination thereof. The one or more contacts may be determined based on a previous interaction with a social media post, a relationship with the user, a list specified by the user, a demographic specified by the user, etc. The user may wish to send the same message to a plurality of contacts, each contact in the plurality of contacts having a used social media platform. In these embodiments, process 300 may be performed for each contact in the plurality of contacts, such that each contact receives the message by their used social media platform. When the recipient is a plurality of contacts, process 300 may be performed in parallel or in series with respect to each contact. Process 300 may also be performed once, wherein each step is taken with respect to each contact. The plurality of contacts is in some instances specified by the user. For example, the user may specify the plurality of contacts to receive each message or provide a default plurality of contacts to receive messages. In other instances, however, the device automatically determines the plurality of contacts. This determination may be based on the content of the message, a history of communication between the user and one or more contacts, contacts with a same used social media platform, contacts with a same used content type, etc. FIG. 2 illustrates an embodiment whereby the user messages two contacts.

Figure 4:
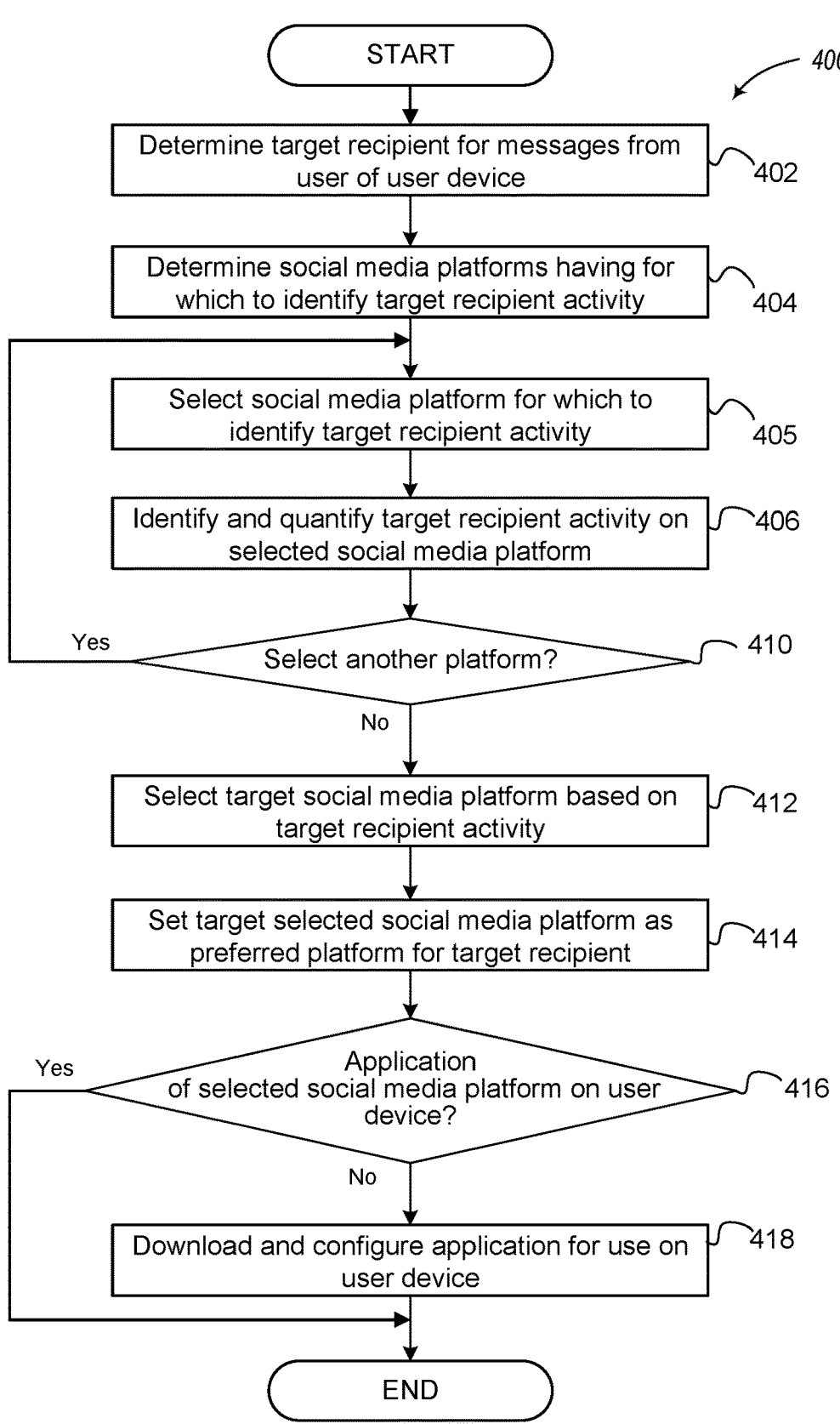
FIG. 4 illustrates a logical flow diagram showing one embodiment of a process for determining and installing an application of a social media platform used by a target recipient in accordance with embodiments described herein.

FIG. 4 illustrates a logical flow diagram showing one embodiment of a process 400 for determining and installing an application of a social media platform used by a target recipient in accordance with embodiments described herein.

Process 400 begins, after a start block, at block 402, wherein a target recipient is determined for messages being sent from a user of a user device. In some embodiments, the target recipient is determined based on input received from the user. For example, the user may select an account of the target recipient to send a message to or select the target recipient from a list of contacts. In various embodiments, block 402 may employ embodiments of block 304 in FIG. 3 to determine the target recipient, such as if process 300 is attempting to modify and send a message to a recipient via a second social media application that is not currently installed on the user device of the sender.

Process 400 then continues from block 402 to block 404, where social media platforms for which to identify target recipient activity are determined. The social media platforms for which to identify target recipient activity may be determined based on a social media platform used by the target recipient. For example, if the user is active on a social media platform, the social media platform may be selected as a social media platform to check for target recipient activity. In some embodiments, social media applications previously used by the target recipient may be checked for target recipient activity. According to some embodiments, the target recipient may state that they use a certain social media platform, for example, in an email signature. In some embodiments, the social media platforms to check may be determined by popularity of the social media platforms. The popularity of the social media platforms may be determined with respect to a demographic of the target recipient. Demographic information correlating an age, occupation, geographic location, or any other demographic information to a usage of a particular social media platform may be used to determine which social media platforms to check for target recipient activity. In some embodiments, target recipient activity includes the target recipient having an account with the social media platform.

Process 400 continues from block 404 to block 405, where a social media platform for which to identify target recipient activity is selected. In some embodiments, each possible social media platform determined at block 404 is systematically selected at block 405 to identify target recipient activity.

Process 400 continues from block 405 to block 406, where target recipient activity on the selected social media platform is identified and quantified. In various embodiments, target recipient activity on the selected social media platform may be identified by querying the selected social media platform for information about an account associated with the target recipient. For example, target recipient activity may be determined by crawling social media content. Quantifying target recipient activity may include counting interactions involving the target recipient, determining a frequency of interactions on the platform by the target recipient, determining a latest interaction date on the platform, or otherwise determining any other summarization of target recipient activity. For example, a count of interactions with the selected social media platform in a specified time period may be obtained.

In some situations, the user may initiate messaging with a known account of the target recipient. The user may have access to a username or email address associated with an account of the target recipient. Target recipient activity on the selected social media platform may then be quantified by querying the social media platform for an account or interactions associated with the known username or email address. In some embodiments, an image of the target recipient can be used to quantify target recipient activity on a social media platform by performing image search. For example, the application manager may obtain a number of times the target recipient appears in images hosted on the selected social media platform. Target recipient activity may in various embodiments be quantified by crawling content on the selected social media platform by any known web crawling algorithm beginning at a selected web page and recording information about interactions involving the target recipient. The selected web page to begin crawling from may in some instances be a web page including an interaction by the target recipient with the selected social media platform. For example, the selected web page to begin crawling from may be a web page the target recipient has visited, left a comment on, etc. According to some embodiments, a search for appearances of the target recipient's name or username may be used to quantify target recipient activity on the social media platform.

After block 406, process 400 proceeds to decision block 410. At decision block 410 a determination is made whether to select another social media platform for which to identify target recipient activity. In some embodiments, determining whether to select another social media platform is based on if all social media platforms for which to identify target recipient activity have been considered. If another social media platform is to be selected, process 400 returns to block 405, where another social media platform is selected and social media checked for target recipient activity.

If all possible social media platforms for the target recipient have been selected to identify target recipient activity, process 400 continues from decision block 410 to block 412. At block 412, a target social media platform is selected for the target recipient based on the user activity identified and quantified in block 406. According to some embodiments, the social media platform having a most recent target recipient activity is selected. According to other embodiments, the social media platform having the most target recipient activity in a time period is selected. For example, the social media platform having the most target recipient activity in the last week may be selected. Alternatively, the target social media platform may be selected based on which of the social media platforms the target recipient is typically active on at a time of day, day of week, or other relevant time period according to the target recipient activity. According to some embodiments, the social media platform having a lowest average response time by the target recipient is selected as the target social media platform. The lowest average response time may be calculated by comparing times at which the target recipient was messaged on a social media platform, and times at which the target recipient responded to a message on a social media platform, then selecting the platform with a lowest average difference. According to some embodiments, the target recipient activity on each of the selected social media platforms is provided to a machine learning algorithm that selects the social media platform most likely to be interacted with by the target recipient in an upcoming time period. In some instances, the social media platform having a highest number of interactions between the user and the target recipient is selected.

After block 412, process 400 continues to block 414, where the selected target social media platform is stored as the preferred or used social media platform of the target recipient. According to some embodiments, information including the used social media platform of the target recipient is stored in a profile of the target recipient. The profile may also contain demographic information, contact information, indications of message history between the user and the target recipient, etc. According to some embodiments, the profile of the target recipient may correspond to one or more rows, columns, or combination thereof in a database. The profile, database, or both the profile and database may be stored locally on the user device, or remotely on one or more servers. If a used social media platform for the target recipient is already stored, input may be solicited from the user to accept or reject the selected social media platform as the used social media platform of the target recipient.

Then, process 400 continues from block 414 to decision block 416, where the application manager determines if the user device already has an application installed for the used social media platform of the target recipient. If there is an application for the used platform on the user device, process 400 ends or otherwise returns to a calling process to perform other actions. According to some embodiments, decision block 416 determines whether the user has an account with the used social media platform of the target recipient. If the user does have an account for the used platform of the target recipient, process 400 ends.

If the user device does not have an application for the used social media platform installed, process 400 continues from block 416 to block 418, where the application of the used social media platform is downloaded to the user's device and configured. In some embodiments, the application manager may register the user for an account with the second social media platform using the second social media application. Configuring the application may also include the application manager managing the application of the used social media platform. Login credentials may be generated and stored for the application of the used social media platform, such that the application manager may automatically log into the used social media platform, periodically update the used platform, etc.

According to some embodiments, the application manager may configure a new account for the platform. Configuring the new account may include generating a username and a password. The username may be a username previously used by the user for another social media account. For example, if the user has used username "Bob123" for one or more social media platforms, "Bob123" may be selected as the username. Similarly, the password may be generated based on one or more passwords used in connection with previous social media accounts of the user. According to some embodiments, the application manager receives the username, the password, or both the username and the password from the user.

According to some embodiments, the username and password generated for the used platform of the target recipient are made accessible to the user such that the user may manually login to the used social media platform of the target recipient. For example, the application manager may send a notification including the generated username and password for the used application of the target recipient to the user through their own used platform. To illustrate, application manager 106a in FIG. 2 may configure a new account for user_1 102a on platform_3 114c such that user_1 102a may communicate with user_3 102c using platform_3 114c. After the new account for user_1 102a is created on platform_3 114c, application manager 106a may send a message including the generated username and password for platform_3 114c to user_1 102a using the used application of user_1 102a, which is application_1 108a in FIG. 2. Application manager may autofill username and password fields provided by the used platform of the target recipient by storing and using the generated username and password.

Configuring the new account may also include automatically performing multifactor authentication for the new account using one or more applications already installed on the user device. For example, many applications require an email address, phone number, or other contact information to be provided during account creation according to an authentication protocol such as OAuth 2.0. A code may be sent to the user during new account configuration using the provided contact information. The application manager may provide the contact information and then monitor a corresponding communication channel for an authentication message from the platform of the new account. The authentication message may include a one-time passcode to provide to the platform to create the new account. The application manager may perform multifactor authentication by automatically providing information in the authentication message to the platform, following a link sent by the platform in the authentication message, etc. According to some embodiments, the application manager automatically performs multifactor authentication as necessary to continue using the new account. For example, some applications may require multifactor authentication to be performed each time a user logs in to the application, or at some interval such as once a day, once a week, once a month, etc. According to some embodiments, the application manager may automatically perform any known method of multifactor authentication.

According to some embodiments, the application manager may create a plurality of accounts for a platform. Both friends and coworkers of the user may use the same platform. But the user may prefer to use different screen names or profiles when communicating with friends versus communicating with coworkers or the public. Therefore, a first account on the platform may be created for use on the platform with friends, and a second account may be created for use with coworkers, for example. After a used platform is set for the target recipient at block 414, the user may be presented with an interface to select an existing account for the used social media application to use in communications with the target recipient (not shown). According to some embodiments, the interface includes one or more input fields where the user may specify an account name for a new account to be created and used in communications with the target recipient. The new account may then be created as described above and used to communicate with the target recipient.

According to some embodiments, the application manager automatically creates an account for a platform before determining that the platform is the used platform of the target recipient. This may allow the target recipient to easily initiate communication with the user, as the user will already have an account for the used platform of the target recipient. The platform to automatically create an account for may be determined by popularity of the platform, a demographic of the user such as age, location, internet search history contacts, etc. Any number of accounts for any number of platforms may be created in this way.

According to some embodiments, the application for the used platform of the target recipient may not be installed on the user device. The application manager may interact with the used social media platform of the target recipient using an application programming interface of the used social media platform.

Figure 5:
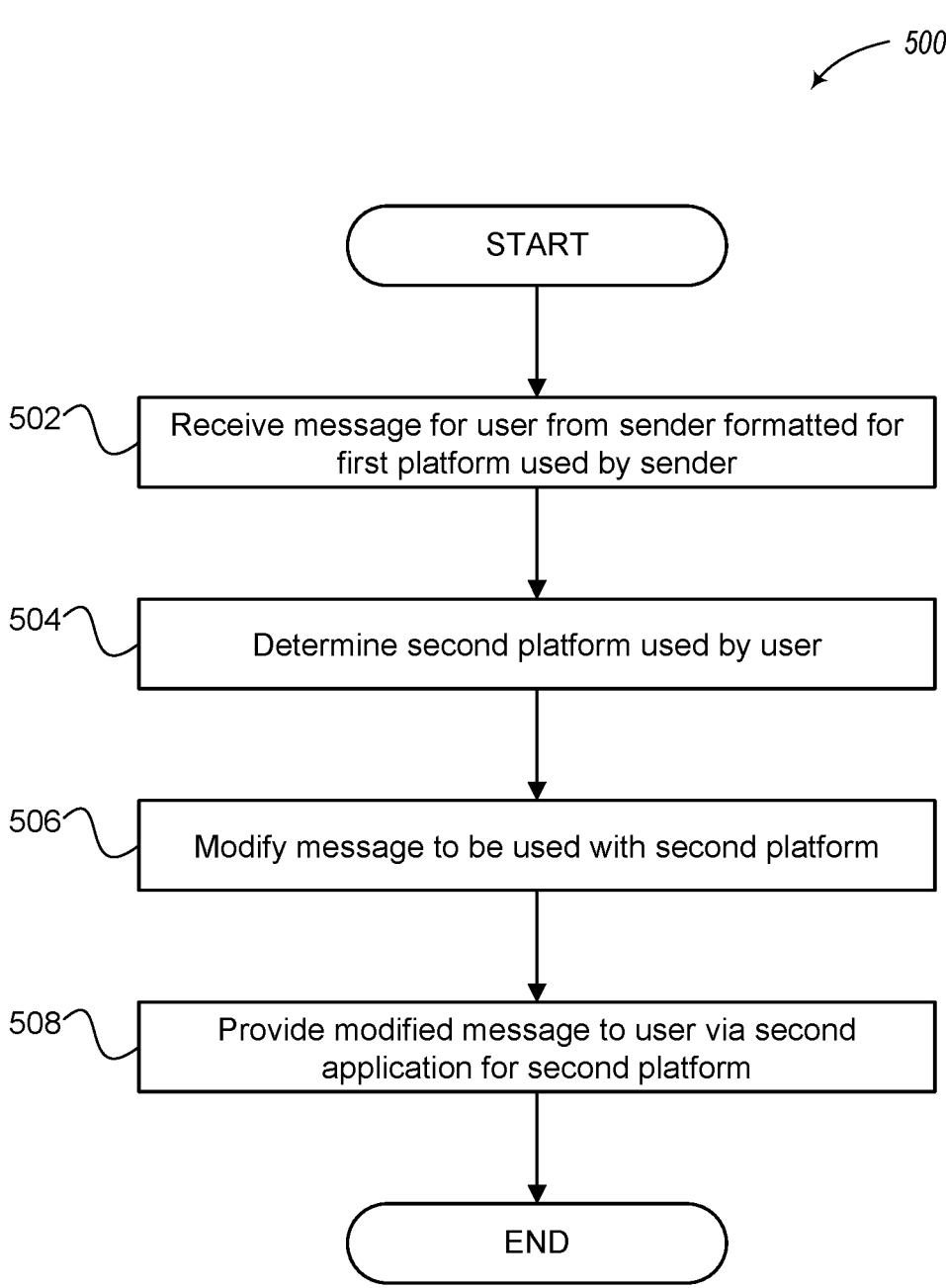
FIG. 5 illustrates a logical flow diagram showing one embodiment of a process for receiving a message for a second social media platform from a sender using a first social media platform in accordance with embodiments described herein.

FIG. 5 illustrates a logical flow diagram showing one embodiment of a process 500 for receiving a message for a second social media platform from a sender using a first social media platform in accordance with embodiments described herein. While the application manager as described with respect to FIGS. 2A and 3 may convert outgoing messages from the user from a first format into a second format for delivery to the target recipient, the application manager may similarly modify incoming messages from a sender. In this situation, the application manager is converting the incoming message from a first format (i.e., a format used by a first platform used by the sender of the message) into a second format (i.e., a format used by a second platform used by the user receiving the message) for delivery to the user, as described below.

Process 500 begins, after a start block, at block 502, where the application manager receives a message for a user of a user device from the sender or originator in the first format of a first platform being used by the sender. In some embodiments, the message is first received by the first application on the user device before being received by the application manager. Then, the first application provides the message to the application manager. The application manager may also, in some embodiments, periodically access the first platform and receive the message from the first application. The periodicity of accessing the first platform may be determined by a frequency with which the user receives messages from the first platform, a total number of messages received by the first platform, etc. According to some embodiments, the application manager monitor incoming data on the user device to intercept the message destined for the first application and does not directly interact with the first application.

Process 500 continues from block 502 to block 504, where a second platform used by the user is determined. In various embodiments, block 504 employs embodiments of block 306 to determine the second platform used by the user. The second platform is a platform used by the user. For example, application_1 108*a* used by user_1 102*a* in FIG. 2B. In some embodiments, the second platform may be specified by the user through a user interface. In various embodiments, the user may specify the second platform for use in communicating with the sender. In some embodiments, the second platform is determined by any of the methods for determining a platform for a recipient described herein. For example, the application manager may monitor an amount of time the user interacts with one or more applications corresponding to one or more platforms and select the platform of the application having the highest frequency of interaction, total interaction time, etc., as the second platform.

Process 500 continues from block 504 to block 506, where the message is modified for use with the second platform. In various embodiments, block 506 may employ embodiments of block 308 to modify the message from a first format of a first platform to a second format of a second platform. Modifying the message for use with the second platform may include modifying metadata of the message, modifying a header, parameter, or status code of the message, modifying the message to conform with a representational state transfer (REST) API of the first platform, etc.

After block 506, at block 508, the modified message is provided to the user via a second application for the second platform. The modified message may be provided to the second application directly through an API, which can then provide the modified message or the content of the message to the user.

After block 508, process 500 ends or otherwise returns to a calling process to perform other embodiments.

To illustrate process 500 in FIG. 5 with respect to FIG. 2B, user device_1 104*a* may receive a message for application_3 112*a* from user device_3 104*c*. But user_1 102*a* uses application_1 108*a* for platform_1 114*a*. Therefore, when application manager 106*a* receives the message, it may modify the message for use with platform_1 114*a* such that the message or its content may be made available to user_1 102*a* using application_1 108*a*.

In some embodiments, the modified message may be sent off user device_1 104*a* to platform_1 114*a*. The platform_1 114*a* may then make the modified message available to user_1 102*a* through application_1 108*a* or any other interface of platform_1 114*a*. Sending the modified message off user device_1 104*a* to platform_1 114*a* may allow platform_1 114*a* to maintain a state including the modified message and consistent with application_1 108*a*. For example, if the modified message is sent directly from application manager 106*a* to application_1 108*a*, the modified message may appear in application_1 108*a* on user device_1 104*a* but may not appear in any other interface of platform_1 114*a* because platform_1 114*a* has not received the message. By sending the modified message off user device_1 104*a* to platform_1 114*a* to be made available through application_1 108*a*, platform_1 114*a* and application_1 108*a* maintain a consistent state.

In some other embodiments, the modified message may be sent from user device_1 104*a* to platform_1 114*a* using a proxy account created by application manager 106*a* for use with respect to the sender of the message. For example, if user_1 102*a* receives a message from user_3 102*c* for platform_3 114*c*, but user_1 102*a* uses platform_1 114*a*, application manager 106*a* may create a proxy account for use by application manager 106*a* with user_3 102*c* on platform_1 114*c*. The proxy account may be used by application manager 106*a* to route the message to user_1 102*a* using application_1 108*a*. In these embodiments, user_3 102*c* appears to user_1 102*a* to be using application_1 108*a*. The username of the proxy account may be based on the username of the target user on their used platform. The username of the proxy account may also include additional characters indicating that it is a proxy account. Similarly, when user_1 102*a* responds to the proxy account, such that the sender of the original message is now the recipient of a new response message, application manager 106*a* may modify the response message for use with platform_3 114*c*, as described herein. In this way, a consistent state including a complete conversation between user_1 102*a* and user_3 102*c* is maintained both on platform_1 114*a*, which user_1 102*a* uses, and platform_3 114*c*, which user_3 102*c* uses.

Figure 6:
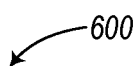
FIG. 6 illustrates a device implementing an application manager to facilitate messaging between various social media applications in accordance with embodiments described herein.

FIG. 6 illustrates a device implementing an application manager to facilitate messaging between various social media applications in accordance with embodiments described herein. System 600 includes a user device 104. One or more special-purpose computing systems may be used to implement the user device 104. Accordingly, various embodiments described herein may be implemented in software, hardware, firmware, or in some combination thereof. The user device 104 includes memory 604, processor 644, I/O interfaces 648, other computer-readable media 650, and network connections 652.

Processor 644 may include one or more central processing units, circuitry, or other computing components or units-collectively referred to as a processor or one or more processors—that are configured to performed embodiments herein or to execute computer instructions to perform embodiments described herein. In some embodiments, a single processor may operate individually to perform embodiments described herein. In other embodiments, a plurality of processors may operate to collectively perform embodiments described herein, such that one or more processors may operate to perform some, but not all, of the embodiments described herein.

Memory 604 may include one or more various types of non-volatile and/or volatile storage technologies. Examples of memory 604 may include, but are not limited to, flash memory, hard disk drives, optical drives, solid-state drives, various types of random access memory (RAM), various types of read-only memory (ROM), other computer-readable storage media (also referred to as processor-readable storage media), etc., or any combination thereof. Memory 604 may be utilized to store information, including computer-readable instructions that are utilized by processor 644 to perform actions, including embodiments described herein.

Memory 604 may store application manager 106. Application manager 106 is configured to manage and modify messages between different social media applications and platforms, as described herein. In some embodiments, the application manager 106 includes a message converter module 608, an administrator module 610, and a checker module 612. Message converter module 608 is configured to convert messages from a format of a first social media platform to a format of a second social media platform. The administrator module 610 is configured to download, install, and manage social media applications 620. In some embodiments, the administrator module 610 may periodically update one or more applications, update or change passwords for applications (e.g., which required by the application), or perform other management actions with the applications. The quantifier module 612 is configured to quantify a recipient's use of a social media platform to determine a preferred platform by a target recipient.

Although FIG. 6 illustrates the message converter module 608, the administrator module 610, and the checker module 612 as separate modules, embodiments are not so limited. Rather, one module, or a plurality of modules, may be utilized to implement the functionality of the message converter module 608, the administrator module 610, and the checker module 612 to perform embodiments described herein.

Memory 604 may also store social media applications 620 and other data 622 (which may include contact lists, used or preferred applications of the user, used or preferred applications of recipients or contacts, login information for various applications, etc.

Network connections 652 are configured to communicate with other computing devices, such as platforms 114a-114c in FIG. 1, other user devices, or other computing devices. I/O interfaces 648 may include one or more data input or output interfaces, video or display interfaces, or other input/output interfaces. Other computer-readable media 650 may include other types of stationary or removable computer-readable media, such as removable flash drives, external hard drives, etc.

User device 654 may include processors, memory, I/O interfaces, network connections, or other computing components, but these components are not shown in FIG. 6 for ease of discussion.

The following is a summarization of the claims as filed.

A method, performed by an application manager on a user device, may be summarized as comprising: receiving a message from a first application for a first social media platform; determining a recipient of the message; determining a second social media platform used by the recipient, wherein the second social media platform is different from the first social media platform; converting the message from a format of the first social media platform to a format of the second social media platform; and providing the message in the second format to a second application for the second social media platform to be sent from the user device to the recipient using the second social media platform.

The method may determine the second social media platform used by the recipient by: scanning a plurality of social media platforms to determine the recipient's use of the plurality of social media platforms; and selecting the second social media platform based on the recipient's use.

The method may determine the second social media platform used by the recipient by: crawling a plurality of social media platforms to quantify activity of the recipient on each social media platform in the plurality of social media applications; and selecting a social media platform from the plurality of social media applications with activity meeting a threshold as the second social media platform.

The method may further comprise: in response to determining the second social media platform, downloading the second social media application for the second social media platform to the user device.

The method may further comprise: in response to determining the second social media platform, downloading the second social media application for the second social media platform to the user device; and registering the user for an account with the second social media platform using the second social media application.

The method may convert the message by: converting audiovisual content in the first format to text content in the second format.

The method may convert the message by: modifying the message for use with the second social media platform.

The method may further comprise: in response to determining the second social media platform, determining a presence of the second application of the second social media platform on the user device.

The method may convert the message by: altering metadata associated with the message.

In some embodiments, the application manager automatically updates the second social media application.

The method may further comprise: updating the second social media application automatically.

The method may further comprise: in response to determining the second social media platform, automatically logging into the second social media application using credentials stored by the application manager.

The method may further comprise: in response to determining the second social media platform, setting the second social media platform as the default platform for the recipient.

The method may determine the second social media platform by: selecting a default platform for the recipient as the second social media platform.

A computing device may be summarized as comprising: one or more memories collectively configured to store computer instructions; and one or more processors collectively configured to execute the computer instructions to: receive, by a first application for a first social media platform, a message from a sender; determine a second social media platform used by the user; convert the message from a format of the first social media platform to a format of the second social media platform; and provide the message in the second format to a second application for the second social media platform to be displayed to the user.

The processor of the computing device may be configured to provide the message in the second format to the second application for the second social media platform by being further configured to: create a proxy account for the second social media platform on behalf of the user; and provide, by the proxy account, the message in the second format to the second social media platform to be provided to the second application.

The processor of the computing device may be configured to determine the second social media platform by being further configured to: quantify the recipient's use of each social media platform in a plurality of social media platforms; and select the second social media platform based on the quantified use.

The processor of the computing device may be further configured to determine the second social media platform by being further configured to: determine a social media platform to query for information about the recipient based on a prior communication of the recipient; and select the second social media platform based on querying the social media platform.

The processor of the computing device may be further configured to: in response to determining the second social media platform: download the second social media application for the second social media platform to the user device; and register the user for an account with the second social media platform using the second social media application.

A non-transitory computer-readable storage medium may be summarized as storing instructions that, when executed by a processor in a computing system, cause the processor to perform actions, the actions comprising: receiving, by an application manager on a user device, a message for a first platform; determining a first recipient of the message and a second recipient of the message; determining a second platform used by the first recipient and a third platform used by the second recipient; generating a first outgoing message by modifying the message for the first platform to comply with a specification of the second platform; generating a second outgoing message by modifying the message for the first platform for use with the third platform; providing the first outgoing message to the second platform to be sent to the first recipient; and providing the second outgoing message to the third platform to be sent to the second recipient.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, performed by an application manager on a user device, comprising:

receiving a message from a first social media application for a first social media platform;

determining an intended recipient of the message;

determining a second social media platform used by the intended recipient, wherein the second social media platform is different from the first social media platform;

converting the received message from a format of the first social media platform to a format of the second social media platform; and providing the converted message in the second format to a second social media application for the second social media platform to be sent from the user device to the intended recipient using the second social media platform.

2. The method of claim 1, wherein determining the second social media platform used by the intended recipient comprises:

scanning a plurality of social media platforms to determine the intended recipient's use of the plurality of social media platforms; and selecting the second social media platform of the scanned plurality of social media platforms based on the determined intended recipient's use.

3. The method of claim 1, wherein determining the second social media platform used by the intended recipient comprises:

crawling a plurality of social media platforms to quantify activity of the intended recipient on each of the social media platforms in the plurality of social media platforms; and selecting a social media platform from the plurality of social media platforms with activity meeting a threshold as the second social media platform used by the intended recipient.

4. The method of claim 1, further comprising:

in response to determining the second social media platform, downloading the second social media application for the second social media platform to the user device.

5. The method of claim 1, further comprising:

in response to determining the second social media platform, downloading the second social media application for the second social media platform to the user device; and registering a user of the user device for an account with the second social media platform using the second social media application.

6. The method of claim 1, wherein converting the message comprises:

converting audiovisual content in the first format to text content in the second format.

7. The method of claim 1, wherein converting the message comprises:

modifying the message for use with the second social media platform.

8. The method of claim 1, further comprising:

in response to determining the second social media platform, determining a presence of the second social media application of the second social media platform on the user device.

9. The method of claim 1, wherein converting the message comprises:

altering metadata associated with the message.

10. The method of claim 1, wherein the application manager automatically updates the second social media application.

11. The method of claim 1, further comprising:

updating the second social media application automatically.

12. The method of claim 1, further comprising:

in response to determining the second social media platform, automatically logging into the second social media application using credentials stored by the application manager.

13. The method of claim 1, further comprising:

in response to determining the second social media platform, setting the second social media platform as a default platform for the intended recipient.

14. The method of claim 1, wherein determining the second social media platform comprises:

selecting a default platform for the intended recipient as the second social media platform.

15. A computing device of a user, comprising:

one or more memories collectively configured to store computer instructions; and one or more processors collectively configured to execute the computer instructions to:

obtain a message from a first social media platform wherein the message is in a first format of the first social media platform and is intended for the user;

determine a second social media platform used by the user, wherein the second social medial platform is different from the first social media platform;

convert the message from the first format of the first social media platform to a second format of the second social media platform; and provide the converted message in the second format to a second application for the second social media platform to be displayed to the user.

16. The computing device of claim 15, wherein the one or more processors are configured to obtain the message in the first format of the first social media platform by being further configured to:

create a proxy account for the first social media platform on behalf of the user; and obtain, by the proxy account, the message in the first format of the first social media platform.

17. The computing device of claim 15, wherein the one or more processors are configured to determine the second social media platform by being further configured to:

quantify the user's use of each social media platform in a plurality of social media platforms; and select the second social media platform based on the quantified user's use.

18. The computing device of claim 15, wherein the one or more processors are further configured to determine the second social media platform by being further configured to:

determine a social media platform to query for information about the user based on a prior communication of the user; and select the second social media platform based on querying the social media platform.

19. The computing device of claim 15, wherein the one or more processors are further configured to:

in response to obtaining the message intended for the user in the first format of the first social media platform:

download a first social media application for the first social media platform to the user device; and register the user for an account with the first social media platform using the first social media application.

20. A non-transitory computer-readable storage medium that stores instructions that, when executed by a processor in a computing system, cause the processor to perform actions, the actions comprising:

receiving, by an application manager on a user device, a message for a first platform;

determining a first intended recipient of the message and a second intended recipient of the message;

determining a second platform used by the first intended recipient and a third platform used by the second intended recipient;

generating a first outgoing message by modifying the message for the first platform to comply with a specification of the second platform;

generating a second outgoing message by modifying the message for the first platform for use with the third platform;

providing the first outgoing message to the second platform to be sent to the first intended recipient; and providing the second outgoing message to the third platform to be sent to the second intended recipient.

* * * * *